United States Patent [19]

Brei et al.

[11] 3,875,345

[45] Apr. 1, 1975

[54] HIGHWAY TRANSFERRING ARRANGEMENT

[75] Inventors: Donald H. Brei, Roselle; Walter Gloeckler, Elk Grove Village, both of Ill.

[73] Assignee: GTE Automatic Electric Laboratories Incorporated, Northlake, Ill.

[22] Filed: Nov. 5, 1973

[21] Appl. No.: 413,096

[52] U.S. Cl. .......................................... 179/18 ET
[51] Int. Cl. .......................................... H04q 3/47
[58] Field of Search ....... 179/18 ET, 18 EB, 175.23, 179/175.2 C, 175.2 R

[56] References Cited

UNITED STATES PATENTS

| | | | |
|---|---|---|---|
| 3,670,109 | 6/1972 | Leyburn et al. | 179/18 ET |
| 3,674,940 | 7/1972 | Leyburn et al. | 179/18 ET |
| 3,806,717 | 4/1974 | Gloeckler | 235/153 AP |

*Primary Examiner*—Thomas W. Brown
*Attorney, Agent, or Firm*—Robert J. Black

[57] ABSTRACT

A communication switching system including a pair of translators and associated translator assignors is disclosed. Each translator and its translator assignor normally serves one-half of the systems register-senders, and each translator and translator assignor is coupled to the register-senders by a data highway and an access control highway, respectively. The highway transferring arrangement is operable to switch the data or access control highway, or both, to an on line translator or translator assignor in the event one of the translators or translator assignors goes off line, in order to keep the system operational.

9 Claims, 2 Drawing Figures

HIGHWAY TRANSFERRING ARRANGEMENT

Figure 1:
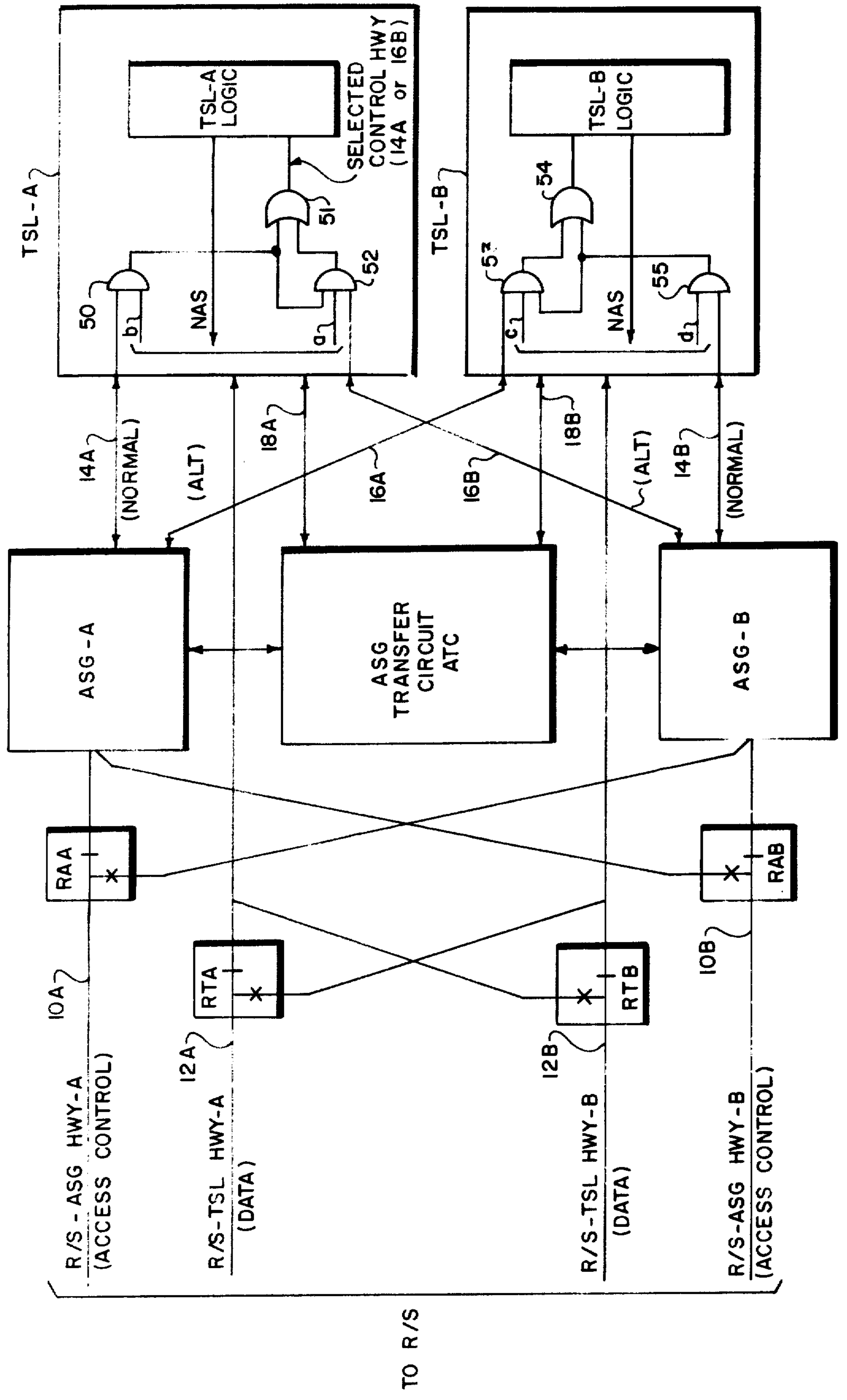

This invention relates to an automatic common control switching system for local and/or toll tandem switching. More particularly, it relates to a transferring arrangement within the system which is used to keep the system operational in the event one of the system's translator assignors or translators goes off line.

More specifically, an automatic common control switching system, commonly called a crosspoint tandem system, is disclosed in U.S. Pat. Nos. 3,806,717 and 3,830,984, issued Apr. 23, 1974 and Aug. 20, 1974, respectively. Its function is to switch calls received on incoming trunks to various kinds of outgoing trunks. The maximum capacity of the crosspoint tandem system is 6,000 incoming trunk terminations.

For a detailed description of the operation of the crosspoint tandem system, reference can be made to these two applications, however, its operation is generally as follows. Each incoming trunk has two major appearances in the crosspoint tandem office, one on a trunk link frame (used for the talking connection) and one on a register-sender access subsystem (used for passing information to the common control equipment). The register-sender access subsystem is the first of the trunk appearances to be used. It consists of two sets of relay switches, with one set comprising trunk switches and the other set comprising registered-sender switches. The incoming trunks appear on the trunk switches and the register-senders on the register-sender switches. As soon as the incoming trunk is seized, it signals a control unit of a register-sender access subsystem to connect an idle register-sender for registering the incoming pulses. The control unit sets up the connection, passes the trunk link inlet identity and trunk pretranslation class of service to the register-sender, and releases from the connection to be free to serve other calls.

As soon as the sender is attached, it signals the originating operator or preceding office sender to begin pulsing. When all of the digits are received, the register-sender signals an assignor to seize a translator. On calls originated from dial pulse trunks, translation may be called for after the third digit to permit resolution of the ambiguities which follow from the introduction of interchangeable NPA and office codes.

When the translator is connected, the register-sender passes the trunk link inlet identity and dialed code digits to the translator. Using these indications, the translator determines the routing information, passes outpulsing instructions back to the register-sender, and signals the assignor to seize an idle marker. The assignor signals the register-sender to connect to the same marker.

When a marker is connected, the translator passes to the marker (sequentially) the trunk link inlet identity, the identity of two office link frames which include the identity of outgoing trunk sub-groups, and the dialed digits received by the translator, and then the translator releases from the call.

The marker then simultaneously seizes the trunk link matrix connect that accesses the trunk links that serve the incoming trunk and seizes the office link matrix connect that accesses the trunks of the outgoing trunk sub-group that appear on one of the two office link frames. The marker selects an idle outgoing trunk, sends a seizure signal forward to the succeeding office and seizes the office link matrix connect that accesses the office links that serve the selected outgoing trunk. The marker then seizes the trunk link matrix connect that accesses the junctors that serve both the incoming trunk and the outgoing trunk.

The market now has access to the test leads for the trunk links, junctors and office links, and it proceeds to set up the connection from the incoming trunk to the outgoing trunk. It makes the channel test by testing groups of three leads simultaneously, selects one group and then operates the crosspoints to establish the selected channel. The marker signals the register-sender that the path has been established and the marker releases from the call.

The sender then outpulses as it has been directed by the translator and cuts through the talking path. The register-sender and register-sender access then release and the call is under control of the incoming trunk. When the incoming trunk receives a release signal from the preceding office, it releases the connection through the office.

The register-sender access subsystem of the crosspoint tandem system interfaces the incoming trunk circuits with the register-senders, and serves 1,000 trunks maximum and 100 register-senders maximum. The trunks and register-senders are further sub-divided into two subgroups of 500 trunks maximum and 50 register-senders maximum. Each subgroup normally operates independently, but the control unit of one subgroup is capable of serving both subgroups of the pair in case of trouble.

A subgroup consists of a number of trunk switches, a number of register-sender switches, and an electronic control unit. These trunk and register-sender switches all are relay switches generally of the type disclosed in U.S. Pat. No. 2,573,889, issued Nov. 6, 1951. The incoming trunk circuits are connected to the trunk switches, and each trunk switch is connected back-to-back with a register-sender switch. The register-sender switches in a subgroup are multiplied together and connected to a number of register-senders.

On seizure, an incoming trunk circuit closes two call-for-service leads. By scanning these leads, the control unit identifies the calling trunk and selects an idle trunk switch, an idle register-sender switch and an idle register-sender. The control unit then operates the trunk switch and register-sender switch which extends the calling incoming trunk to the selected register-sender. The established connection permits the preceding office to inpulse into the register-sender, and permits the register-sender to outpulse to the succeeding office and to control the connection.

The control unit derives the trunk link frame inlet identity and the trunk pre-translation class mark from the trunk switch shelf identity, the trunk switch inlet identity and internal strapping. The control unit then transmits the trunk link frame inlet identity, the trunk pre-translation class mark and the register-sender access link identity over the data highway to the register-sender and releases from the call. The trunk and register-sender switches release from the call when the register-sender releases from the call.

The system includes two translators and two translator assignors. Each translator and its assignor functions with one half of the register-senders in the office, so that both translators and both assignors are normally on line and processing different calls at the same time.

Each assignor has a 136 lead electromechanical highway used for register-sender identification and selection. Each translator has a 140 lead electromechanical data highway used for transferring call processing data between a register-sender and a translator. Each of these highways has a relay transfer circuit capable of connecting it to the opposite unit so that both sets of highways can access one assignor and translator pair, and in addition, as a second alternative, one translator and the opposite assignor.

An electronic control highway is provided between a translator and its assignor, and a second identical highway is provided between a translator and the opposite assignor. For each translator, only one of these highways is selected at a time. The one selected is determined by the configuration of the other highways.

The transfer circuit or arrangement with which the present invention is concerned is completely automatic in operation both when a unit is taken out of service manually or as a result of failure.

Accordingly, it is an object of the present invention to provide an improved automatic common control switching system for local and/or toll tandem switching. More particularly, it is an object to provide a transferring arrangement for keeping the system operational in the event one of the system's translator assignors or translators goes off line.

Other subjects of the invention will in part be obvious and will in part appear hereinafter.

Figure 2:
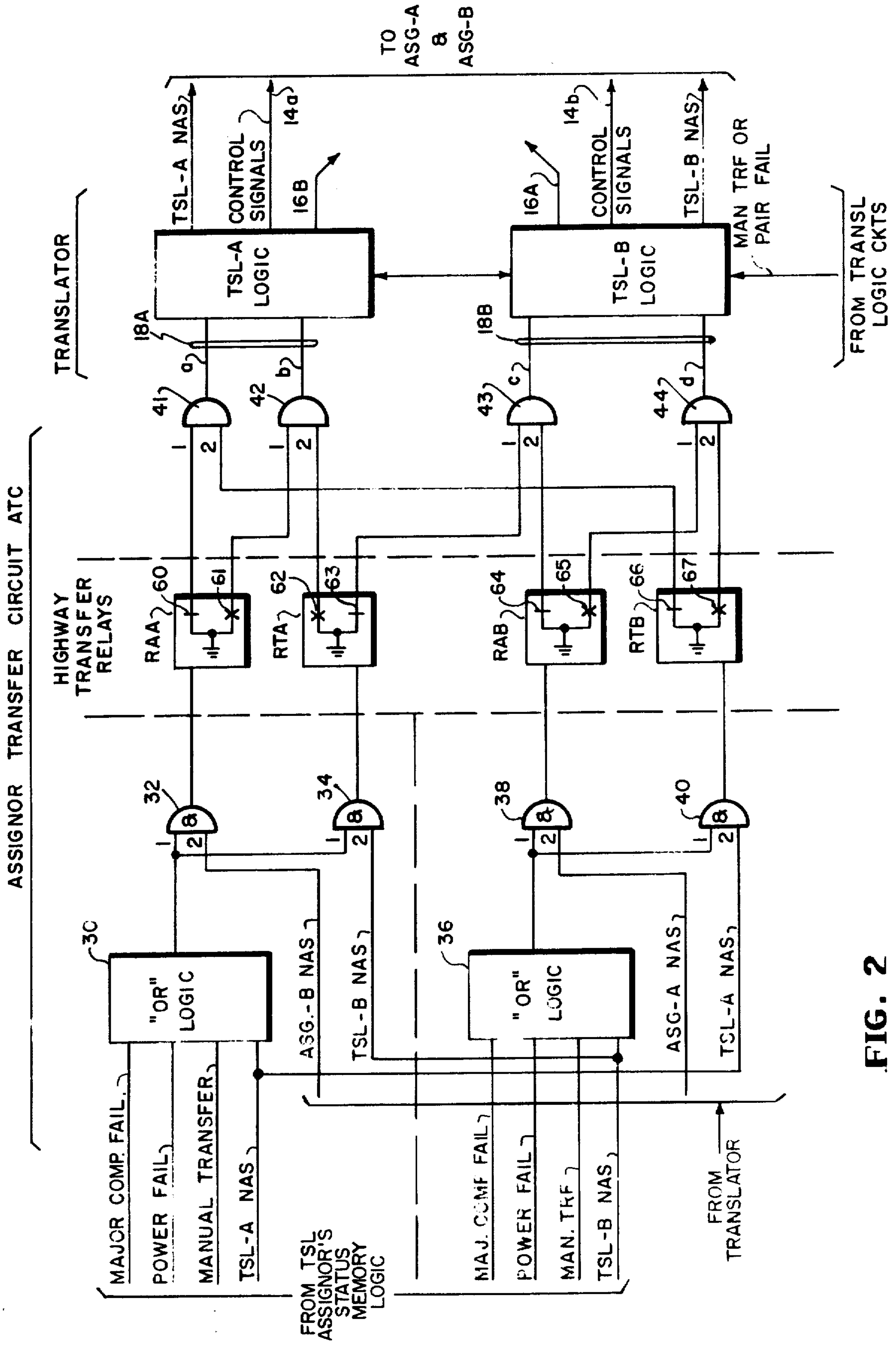

For a fuller understanding of the nature and objects of the invention, reference should be had to the following detailed description taken in connection with the accompanying drawings, in which:

FIG. 1 is a block diagram schematic of the translator assignor-translator highway transfer arrangement; and FIG. 2 is a block diagram schematic of the transfer arrangement.

Referring now to the drawings and particularly FIG. 1 thereof, it can be seen that the system, as explained above, includes two translators TSL-A and TSL-B and two translator assignors ASG-A and ASG-B. Each translator and its assignor functions with one half of the register senders in the office, so that both translators and both assignors are normally on line and processing different calls at the same time. The assignors ASG-A and ASG-B have 136 lead electromechanical access control highways 10A and 10B, respectively, which are used for register-sender identification and selection. The translators TSL-A and TSL-B have 140 lead electromechanical data highways 12A and 12B, respectively, which are used for transferring call processing data between a register-sender and translator. The manner in which these access control highways 10A and 10B, and data highways 12A and 12B are used for identification and selection, or for passing call processing data, form no part of the present invention, and these functions therefore are not further discussed. Each of these highways has a relay transfer circuit RAA, RTA, RAB and RTB capable of connecting to the opposite assignor or translator so that both sets of highways can access one assignor and translator pair. In addition, as a second alternative, should the translator of the pair fail, the relay transfer circuits are operable to establish a connection with the operable translator, as explained more fully below.

Also, an electronic control highway 14A is provided between the translator TSL-A and its assignor ASG-A, and a corresponding control highway 14B is provided between the translator TSL-B and its assignor ASG-B. A second identical alternate highway 16A and 16B is provided between the translator TSL-A and the opposite assignor ASG-B, and between the translator TSL-B and the assignor ASG-A, respectively. For each translator, only one of these highways is selected at a time, depending upon the configuration of the other highways.

The relay transfer circuits RAA, RAB, RTA and RTB represent groups of relays that provide transfer contact (not shown) and contacts 60–67 for selecting a control highway (14A, 14B, 16A or 16B), as described more fully below. Normally, these relays are not energized so that the highways 10A and 12A are connected to the assignor ASG-A and translator TSL-A, respectively, and the highways 10B and 12B are connected to the assignor ASG-B and translator TSL-B respectively. These relays are controlled by an assignor transfer circuit ATC which monitors the not-available-for-service conditions (manual busy out, power failure or clock failure, FIG. 2). When these relays are de-energized, a signal is sent to the translators TSL-A and TSL-B, respectively, from the assignor transfer circuit ATC for each translator to select its normal assignor-transfer control highway 14A and 14B.

If any one of the translators or assignors is put off line, its highways are transferred to the other pair. For example, if translator TSL-A is put off line, the assignor transfer circuit ATC operates relay transferring circuits RAA and RTA so that both the highways 10A and 12A are connected to the assignor ASG-B and translator TSL-B, respectively.

If the translator TSL-A now is put back on line, the relay transfer circuits RAA and RTA restore automatically, and the system is now back to normal with both assignors and translators on line. If translator TSL-A was not put back one line and instead assignor ASG-B was taken off line (assuming assignor ASG-A is available), the second stage of the transfer takes place. The relay transfer circuit RAA is released and the relay transfer circuit RAB is operated so that the highways 10A and 10B are connected to the assignor ASG-A and the highways 12A and 12B are connected to the translator TSL-B. This also disables the control highway 14B between assignor ASG-B and translator TSL-B and enables the alternate control highway 16A between assignor ASG-A and translator TSL-B. Whenever an assignor is off line, it must be manually reset, so it stays in this condition until a reset button on an assignor test panel (not shown) is operated. The system is symmetrical so that the opposite to this situation can also take place, if translator TSL-B is taken off line.

This cross-over transfer is capable of taking place in either direction regardless of which unit is taken off line first. The previous example showed a translator going off line first. If the assignor ASG-A is taken off line first, the relay transfer circuits RAA and RTA operate as before and connect both highways 10A and 12A to the assignor ASG-B and translator TSL-B. Now if translator TSL-B is taken off line, the relay transferring circuit RTA restores and the relay transferring circuit RTB is operated so that the highways 10A and 10B are connected to the assignor ASG-B and the highways 12A and 12B are connected to the translator TSL-A. Also, the control highway 14B between assignor ASG-B and translator TSL-B is disabled and the alternate control highway 16B between assignor ASG-B and translator TSL-A is enabled. The system remains in this configuration until manually reset.

The uniqueness of this arrangement is its ability to attempt to keep the overall system operational with several stages of highway crossovers even though only one assignor and one translator may be available regardless of the order in which these units go off line.

Referring now to FIG. 2, the manner in which the transferring arrangement functions is more clearly shown. The relay transfer circuits RAA, RAB, RTA, and RTB, and the various logic gates illustrated, all are included within and form a part of the assignor transfer circuit ATC. As indicated above, these relay transfer circuits RAA, RAB, RTA and RTB represent groups of relays that provide transfer contacts used for transferring the highways 10A, 10B, 12A and 12B. Normally, these relays are not energized, and ground (logic 0 level) is extended through a normally closed contact 60 to input one of the AND gates 41, through the normally closed contact 63 to the input 1 of the AND gate 43, through the normally closed contact 64 to the input 2 of the AND gate 43, and through the normally closed contact 66 to the input 2 of the AND gate 41. These logic 0 level signals effectively disable the AND gates 41 and 43. The inputs 1 and 2 of the AND gate 42 are effectively at a logic 1 level, thus the AND gate 42 is enabled to produce an output on the lead *b* of the group of leads 18A. Correspondingly, the inputs 1 and 2 of the AND gate 44 are effectively at a logic 1 level, thus the AND gate 44 likewise is enabled to provide an output on the lead *d* of the group of leads 18B.

As can be best seen in FIG. 1, the *b* lead is coupled to the AND gate 50 within the translator TSL-A and the lead *d* is coupled to the AND gate 55 within the translator TSL-B. The inputs on these leads to the AND gates 50 and 55 effectively enables them so that control signals on the control highway 14A are coupled through the AND gate 50 and the OR gate 51 to the translator TSL-A logic, and the control signals on the control highway 14B are coupled through the AND gate 55 and the OR gate 54 to the translator TSL-B logic. The output of the AND gate 50 also effectively disables the AND gate 52 and the output of the AND gate 55 also effectively disables the AND gate 53. These AND gates 52 and 53 are enabled by signals on the *a* and *c* leads to permit control signals on the alternate control highways 16A and 16B to be coupled through these respective gates and the OR gate 51, or the OR gate 54, to the translator's logic, as more fully described below. Accordingly, during normal operating conditions, the control highway 14A is normally coupled between the assignor ASG-A and the translator TSL-A, and the control highway 14B is normally coupled between the assignor ASG-B and the translator TSL-B.

The relay transfer circuits RAA, RAB, RTA and RTB are controlled by the assignor transfer circuit ATC which monitors the not-available-for-service conditions of the translators TSL-A and TSL-B and the assignors ASG-A and ASG-B. These not-available-for-service conditions include, for example, major component failures, power failures, manual transfers, and translator failures indicated by the inputs TSL-A NAS and TSL-B NAS. These not-available-for-service conditions are monitored by the logic gates 30 and 36 which may be, for example, NAND gates with an OR logic function, and which normally output logic 0 level signals to the AND gates 32, 34, 38 and 40, thus effectively disabling them. If both of the assignors ASG-A and ASG-B and both of the translators TSL-A and TSL-B are operational, the status memory logic within the assignors and the logic within the translators output a logic 1 level signal on the service leads labeled ASG-B NAS, TSL-B NAS, ASG-A NAS, and TSL-A NAS, respectively, indicating that both assignors and both translators are, in fact, operational.

As indicated above, if any one of the translators or assignors is put off line, its highways are transferred to the other pair. For example, if translator TSL-A is put off line, the signal on the service lead TSL-A NAS from the translator TSL-A to the assignor transfer circuit ATC goes to a logic 0 level, and operates the logic gate 30 such that it now outputs a logic 1 level signal to the input 1 of both of the AND gates 32 and 34. The TSL-A NAS lead coupled to the input 2 of the AND gate 40 also goes to a logic 0 level, however, this signal has no effect on the AND gate 40 at this time.

Since the ASG-B NAS lead is at a logic 1 level (indicating assignor ASG-B is operational), the AND gate 32 is enabled when the logic 1 level signal is coupled from the logic gate 30 to its input 1, and it outputs a logic 1 level signal to the relay transfer circuit RAA which is effective to operate the relays thereof, via relay drivers (not shown). When the relays of the relay transfer circuit RAA operate, the access control highway 10A is switched to the assignor ASG-B, and the ground or logic 0 level signal is switched from the input 1 of AND gate 41, via the contact 60, to the input 1 of the AND gate 42, via the normally open contact 61.

Correspondingly, the AND gate 34 is enabled since its input 1 and 2 now are both at a logic 1 level, and it outputs a logic 1 level signal to the relay transfer circuit RTA which is effective to operate the relays thereof, via relay drivers (not shown). When the relays of the relay transfer circuit RTA operate, the data highway 12A is switched to the translator TSL-B, and the ground or logic 0 level signal is switched from the input 1 of AND gate 43, via the contact 63, to the input 2 of the AND gate 42, via the normally open contact 62.

At this time, the previously enabled AND gate 42 is disabled, since its input 1 and 2 both are now at logic 0 level. The AND gate 50 in the translator TSL-A (FIG. 1) thus is disabled, preventing any control signals from the assignor ASG-A from being coupled through it to the translator's logic. Also, the assignor ASG-B and the translator TSL-B are handling both sets of highways 10A and 10B, and 12A and 12B.

If the translator TSL-A now is put back on line, the TSL-A NAS lead goes back to a logic 1 level signal, under the control of the translator's logic. When it does, the logic gate 30 again is operated to output a logic 0 level signal, to thus effectively disable the AND gates 32 and 34. With these gates disabled, the relays of the relay transfer circuits RAA and RTA restore, thus the system is now back to normal operation.

If the translator TSL-B had been taken off line, corresponding operations would have occurred, with the relays of the relay transfer circuits RAB and RTB being operated, to switch the access control highway 10B to the assignor ASG-A and the data highway 12B to the translator TSL-A.

Furthermore, if either of the assignors ASG-A or ASG-B suffer a failure or is manually transferred, the logic gate 30 or 36 is operated to output a logic 1 level signal, as described above, to the AND gates 32 and 34, or 38 and 40. The access control and data highways then would be switched to the operational one of the assignors and translators, in the manner described.

If the translator TSL-A is off line, as described above, and the assignor ASG-B now is taken off line, the lead ASG-B NAS goes to a logic 0 level, and thus disables the AND gate 32. The relay transfer circuit RAA therefore restores, and the input 1 of the AND gate 41 goes to a logic 1 and the input 1 of the AND gate 42 goes to a logic 0.

Also, the logic gate 36 is operated to output a logic 1 level signal to the input 1 of both AND gates 38 and 40. The AND gate 38 is enabled by this signal since the assignor ASG-A is operational and the lead ASG-A NAS is at a logic 1 level. The relays of the relay transfer circuit RAB are operated by the output of the AND gate 38, thus causing a logic 1 level signal to be coupled to the input 2 of the AND gate 43 and a logic 0 level signal to be coupled to the input 1 of the AND gate 44.

Under these conditions, with relay transfer circuits RAA and RTB restored and the relay transfer circuits RTA and RAB operated, both access control highways 10A and 10B are coupled to the assignor ASG-A and both data highways 12A and 12B are coupled to the translator TSL-B. Also, only the AND gate 43 has both its inputs 1 and 2 at a logic 1 and hence is enabled to output a logic 1 level signal on the *c* lead. As can be seen in FIG. 1, this logic 1 level signal on the *c* lead enables the AND gate 53 so as to permit control signals to be coupled through it from the assignor ASG-A via the alternate control highway 16A. These control signals then are gated through the OR gate 54 to the logic of the translator TSL-B.

As indicated above, this cross-over technique is capable of taking place in either direction regardless of which unit is taken off line first. The arrangement therefore attempts to keep the system operational even though only one assignor and one translator is available for service.

It will thus be seen that the objects set forth above among those made apparent from the preceding description, are efficiently attained and certain changes may be made in carrying out the above method and in the construction set forth. Accordingly, it is intended that all matter contained in the above description or shown in the accompanying drawings shall be interpreted as illustrative and not in a limiting sense.

Now that the invention has been described, what is claimed as new and desired to be secured by Letters Patent is:

1. In a communication switching system including a plurality of incoming trunks, a plurality of register-senders, a switching network for connecting any one of said incoming trunks with any one of said register-senders, a pair of translators, a translator assignor associated with each of said translators, each of said translators and its associated translator assignor normally being on line serving a predetermined number of said plurality of register-senders and being connected thereto by means of a data highway and an access control highway, respectively, the improvement comprising a highway transferring arrangement for keeping said system operational in the event one of said translators or one of said translator assignors goes off line, said arrangement comprising a relay transfer circuit associated with each of said access control highways and each of said data highways and operable to disconnect an access control highway from a translator assignor to which said access control highway normally is connected and connect said access control highway to the opposite translator assignor and to disconnect a data highway from a translator with which said data highway normally is connected and connect said data highway to the opposite translator, and control means comprising gating means operated responsive to signals indicating the on line or off line condition of the respective ones of said translators and translator assignors for operating the associated ones of said relay transfer circuits to couple the access control highway associated with a translator assignor which goes off line to the other one thereof and the data highway associated with a translator which goes off line to the other one thereof, whereby a data highway or an access control highway associated with an off line translator or an off line translator assignor is switched and connected to the other on line translator or translator assignor, respectively, and said one on line translator or translator assignor serves both of said data or access control highways.

2. The arrangement of claim 1, wherein said gating means are coupled to operate the associated ones of said relay transfer circuits to simultaneously switch and couple both the data and access control highways associated with a translator and its associated translator assignor to the other one of said translators and translator assignors, respectively, in the event either said translator or its associated translator assignor goes off line.

3. The arrangement of claim 2, further including a control highway between each of said translators and its associated translator assignor, highway gating means normally enabled to permit control signals to be coupled between said translators and associated translator assignors via said control highways, said relay transfer circuits being operated to disable said highway gating means to prevent control signals from being coupled between an off line translator and its associated translator assignor.

4. The arrangement of claim 3, wherein said highway gating means are coupled to automatically operate associated ones of said relay transfer circuits to switch and to couple a data highway or an access control highway to a translator or translator assignor which is off line but operational in the event of a subsequent failure of an on line translator or translator assignor.

5. The arrangement of claim 4, further including an alternate control highway between each of said translators and the opposite one of said translator assignors, said highway gating means for both selecting ones of said control highways and said alternate control highways, said relay transfer circuits normally enabling said highway gating means to permit control signals to be coupled between said translators and associated translator assignors via said control highways, and operated to disable said highway gating means to prevent control signals being coupled between an off line one of said translators and its associated translator assignor via said control highway and to enable said highway gating means to permit control signals to be coupled between a translator and the opposite one of said translator assignors via said alternate control highway in the event of a subsequent failure of an on line translator or translator assignor.

6. The arrangement of claim 1, wherein said gating means comprises an input logic gate and a pair of output logic gates associated with each translator and its associated translator assignor, each of said input logic gates having signals indicating the on line or off line condition of said one translator and its associated translator assignor coupled to it, said input logic gates being coupled to one input of each of said pair of output logic gates and said output logic gates being coupled respectively to said relay transfer circuits associated with the data and access control highways associated with said one translator and its associated translator assignor, said pair of output logic gates each having a second input to which is coupled a signal indicating the operational status of the other translator or its associated translator assignor, respectively, said output logic gates being operable when enabled by coincidence signals on its inputs to operate said relay transfer circuits.

7. The arrangement of claim 6, wherein said input logic gates comprise NAND logic with an OR function, and said output logic gates comprise AND gates.

8. The arrangement of claim 5, wherein said highway gating means comprises a plurality of control AND gates, each having a pair of inputs from predetermined ones of said relay transfer circuits and an output, said outputs each being coupled to one of a plurality of selection AND gates which have one end of said control highway and said alternate control highways coupled thereto as inputs, respectively, said relay transfer circuits being operable to enable predetermined ones of said control AND gates to provide inputs to said selection AND gates to permit control signals on said control highways and on said alternate control highways to be gated through said selection AND gates, in accordance with the on line or off line condition of said translators and translator assignors.

9. The arrangement of claim 8, wherein said relay transfer circuits each comprise a plurality of relays having transfer contacts for switching and coupling said data and access control highways from one translator and translator assignor to the other ones thereof, and logic contacts for coupling logic signals to said control AND gates.

* * * * *